United States Patent [19]

Nicholson et al.

[11] Patent Number: 4,907,915

[45] Date of Patent: Mar. 13, 1990

[54] TEMPLATE FOR INSTALLING PHOTOVOLTAIC PANEL ASSEMBLY AND METHOD

[75] Inventors: Robert D. Nicholson, Pemberville; Steven A. F. Kaake, Toledo; Robert F. Smith, Walbridge, all of Ohio

[73] Assignee: Glasstech, Inc., Perrysburg, Ohio

[21] Appl. No.: 343,051

[22] Filed: Apr. 25, 1989

[51] Int. Cl.⁴ .............................................. E02D 5/00
[52] U.S. Cl. .................................... 405/229; 405/232; 405/303
[58] Field of Search ............... 405/229, 231, 232, 228, 405/227, 303, 224; 175/11, 16; 166/288, 366, 359; 299/11; 404/84

[56] References Cited

U.S. PATENT DOCUMENTS

| | | | |
|---|---|---|---|
| 3,236,055 | 2/1966 | Tokola | 405/228 |
| 3,448,511 | 6/1969 | Suter | 405/228 X |
| 3,953,145 | 4/1976 | Teach | 404/84 |
| 4,051,587 | 10/1977 | Boyadjieff | 405/229 X |
| 4,110,993 | 9/1978 | Heerema | 405/228 |
| 4,180,349 | 12/1979 | van Bilderbeek | 405/224 |
| 4,212,562 | 7/1980 | Stone et al. | 405/229 X |
| 4,371,287 | 2/1983 | Johansson | 404/84 |
| 4,637,757 | 1/1987 | Aagaard | 405/228 X |
| 4,674,920 | 6/1987 | Regan et al. | 405/228 X |
| 4,687,062 | 8/1987 | Beghetto et al. | 166/366 |

Primary Examiner—Dennis L. Taylor
Attorney, Agent, or Firm—Brooks & Kushman

[57] ABSTRACT

Provided is a method and apparatus for installing in the ground an array of posts of a photovoltaic panel support assembly. According to the invention, there is provided an adjustable template which comprises a rigid frame having a plurality of adjustable post guides and a plurality of guide rails, which are used in cooperation with an impact driver to install a plurality of support posts quickly and easily. The template is portable and provided with clamping means and a plurality of laser targets for use in cooperation with an alignment laser and an elevation laser to secure and align the template to previously installed posts.

36 Claims, 4 Drawing Sheets

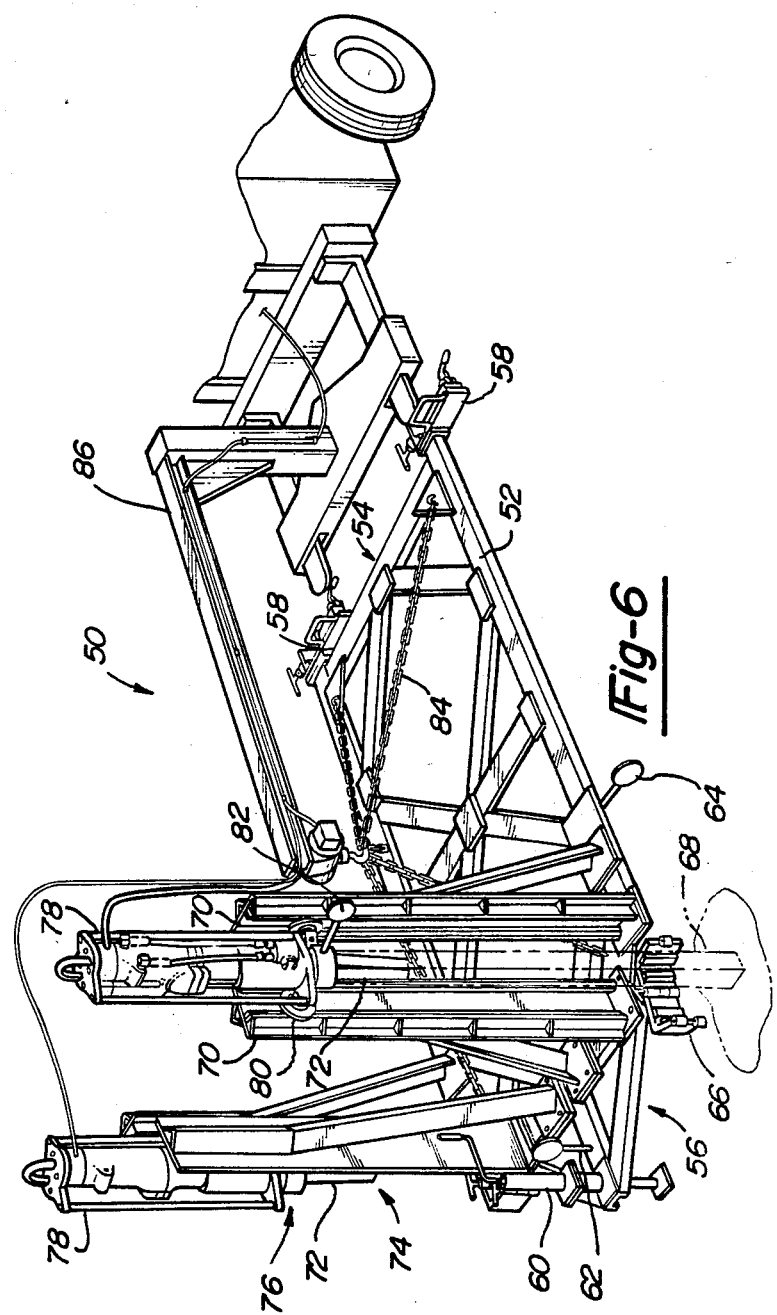

TEMPLATE FOR INSTALLING PHOTOVOLTAIC PANEL ASSEMBLY AND METHOD

TECHNICAL FIELD

The present invention relates to a solar energy collection system and more particularly to a template and method for installing an array of posts of a photovoltaic panel support assembly.

BACKGROUND ART

Since the discovery by the University of Dundee Group in the early 1970's, that high-quality, low density of states amorphous silicon could be produced from the decomposition of silane ($SiH_4$) gas in a glow discharge, amorphous silicon photovoltaic devices, especially amorphous silicon photovoltaic panels have emerged as a dominant force in the marketplace. These devices are much cheaper to manufacture in comparison to former crystalline devices. As a result, there has been renewed interest by industry in developing photovoltaic assemblies which can harness solar radiation and convert it directly to electricity on a large scale basis. The concept of "solar fields" as they are termed in the art, is actively being researched. To date, a number of experimental solar fields have been installed throughout the United States for scientific study.

While the general costs of producing the panels themselves have been reduced dramatically, the labor costs associated with installing the support structures for the panels remain high. For example, a typical one mega watt field might contain fifty-six rows of panels with one hundred ten or more support posts per row for a total of more than six thousand support posts. Under conventional methods of installation, each of the six thousand+ posts must be individually mounted, oriented and leveled to specification in order to properly support the photovoltaic panels and maintain maximum efficiency of the solar field. Additional expenses are required to employ highly skilled men and women knowledgeable in the assembly of photovoltaic panels.

Various designs for templates used to drill underwater wells and drive piles into the sea-bottom are presently in operation. For example, U.S. Pat. No. 4,687,062 issued to Beghetto et al. discloses a light-weight, adjustable undersea template of variable dimensions for use in drilling wells under the sea floor. In operation, the template is leveled with the seabed and secured to the underlying terrain by cemented mooring piles.

U.S. Pat. No. 4,180,349 issued to Van Bilderbeek discloses a method for using an underwater template having a plurality of pile housings through which piles are driven into the earth at the sea floor to fix the template in place. The template is provided with grooves or lands and the pile section within the housing or jacket is expanded into mechanically interlocked relation in the grooves and with the lands by the application of an internal expansive force initiated or controlled from a remote location, such as from a platform or vessel on top of a body of water.

U.S. Pat. No. 4,110,993 issued to Heerema discloses an apparatus for driving piles into the sea-bottom from the support of a substructure resting on the sea-bottom of a working island to be installed. The Heerema apparatus comprises a plurality of support construction attached to a column each having guide passage openings for the piles and the followers.

U.S. Pat. No. 4,637,757 issued to Aagaard discloses a method and apparatus for anchoring a tension leg platform to the sea floor. The platform comprises a hollow pile that decreases in internal diameter partially down the length of the pile and contains 50 to 100 barbs placed at approximately 90 degrees to the axis of the pile. The platform accommodates a spreader tool that may be inserted into the pile to force the barbs outwardly.

While each of the references cited above discloses the use of a template to install a support structure, in all instances they are limited to the pile forging art.

Apart from underwater applications, the time and labor expenses associated with conventional methods of installing support structures in the ground in general have been acknowledged by the industry and have to some extent hindered the development of solar fields. However, if any one of these factors could be eliminated or reduced, the overall costs of installing photovoltaic panel support structures would be greatly reduced. As a result, the installation of photovoltaic panels in solar fields would be more economically feasible and solar energy collection systems would be accepted by industry as a true alternative to conventional energy generation systems.

SUMMARY OF THE INVENTION

To resolve the difficulties noted above, the present invention is directed to an adjustable template and method of installing in the ground an array of posts of a photovoltaic panel support assembly. When used properly, the template and method disclosed and claimed herein dramatically reduces the time and skill requirements normally associated with the installation of these structures.

In carrying out the present invention, there is provided a template comprising a rigid adjustable frame to be positioned horizontally and longitudinally on the ground. The frame is further provided with a reference end having clamping means affixed thereto for fastening the frame to one or more reference posts or previously installed posts and aligning the frame therewith. Additionally, the frame is provided with a work end having a plurality of post guides which are affixed at predetermined locations. The post guides are used to position posts which are to be installed and guide them into the ground during installation.

There is further provided a plurality of guide rails which are affixed to the frame work end at predetermined locations. During installation, these guide rails support the posts which are being driven into the ground.

As set forth above, the template frame is adjustable and may be varied in length and/or width in accordance with the desired spacing to be set between the posts when installed.

Provision is also made for the use of an impact driver to drive the posts into the ground in cooperation with the template. Accordingly, there is provided a drive chuck having an impact end for engagement with the impact driver and a driving end for engagement with a post. The drive chuck is further adapted to cooperate with the guide rails to drive the posts through the post guides and into the ground in a predetermined orientation.

After the posts are driven into the ground, the template is then repositioned so that it may be affixed to one or more previously installed posts and properly aligned therewith. The replicative steps of positioning the template, driving the posts and repositioning the template for further installation may be performed easily and accurately by persons with a minimum degree of skill or knowledge of photovoltaic support structures. As a result, a solar field comprising an array of support posts may be installed more efficiently than contemplated by previously known methods of installation.

The objects, features and advantages of the present invention are readily apparent from the following detailed description of the best mode for carrying out the invention when taken in connection with the accompanying drawings.

BRIEF DESCRIPTION OF THE DRAWINGS

FIG. 6 is an alternative embodiment of the invention shown in FIGS. 1-3.

DESCRIPTION OF THE PREFERRED EMBODIMENT

Figure 1:
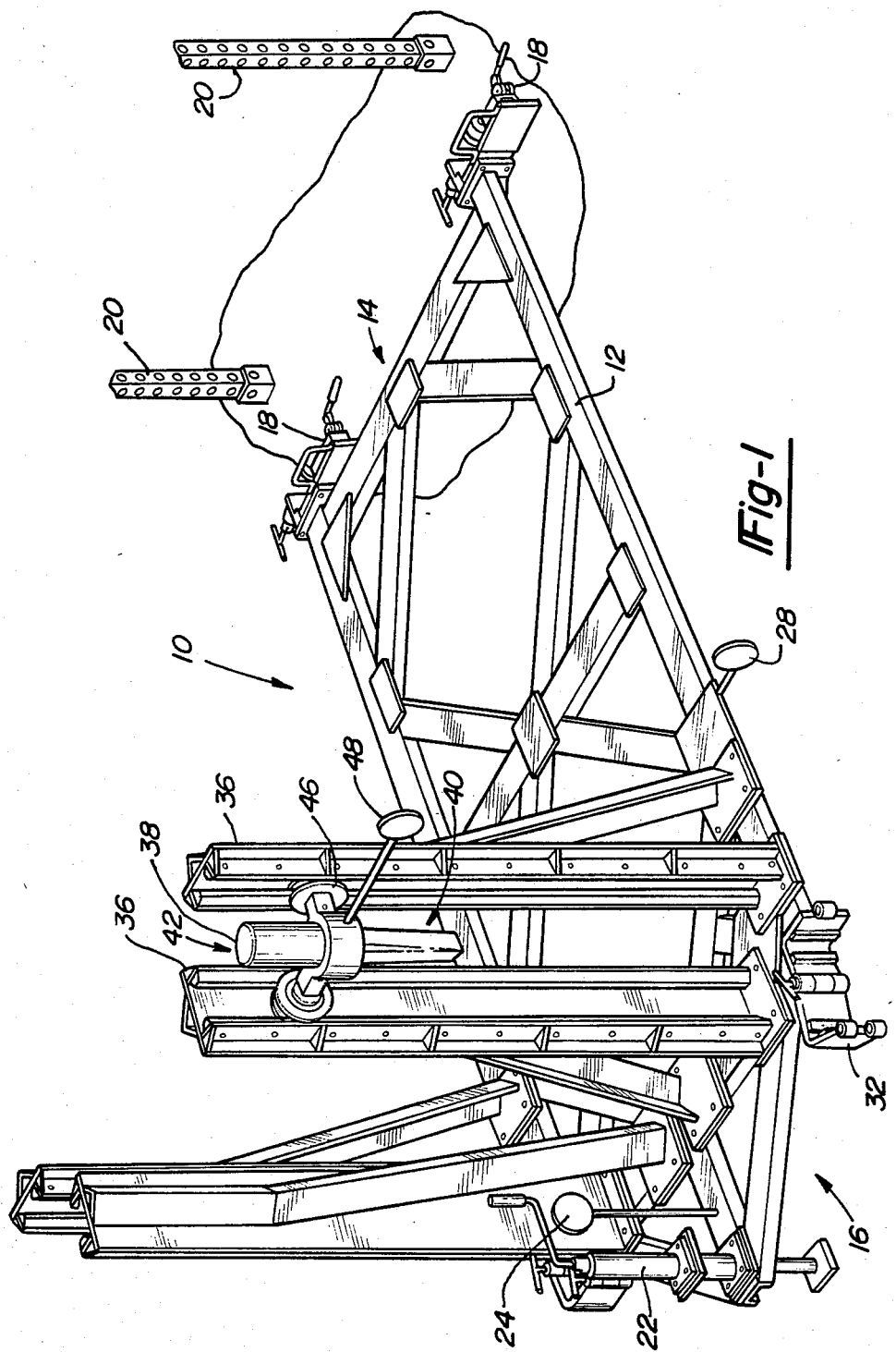
FIG. 1 is a perspective view illustrating the complete template.

With reference to FIG. 1 of the drawings, a template for installing in the ground an array of support posts of a photovoltaic panel support assembly is indicated generally by reference numeral 10 and comprises a rigid frame 12 having a reference end 14 and a work end 16. Upon inspection of FIGS. 1-5, it will be seen that there is provided clamping means in the form of a plurality of releasable clamps 18 affixed to the frame reference end 14 at predetermined locations for fastening the frame 12 to reference posts 20. There is further provided a jack 22 and elevation monitoring means in the form of a first laser target 24 affixed to the frame work end 16 for use in cooperation with an elevation laser (spinning laser) 26 to monitor and adjust the elevation of the template 10 to a predetermined height. It is contemplated that elevation laser 26 will be mounted at a predetermined location in the solar field.

Figure 3:
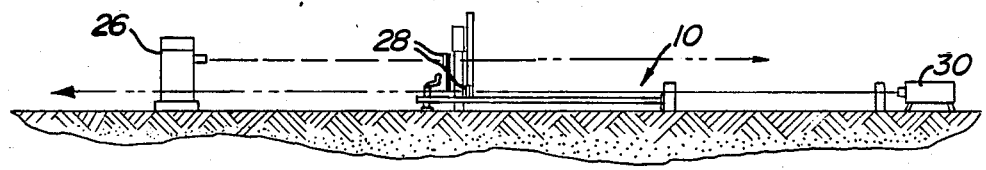
FIG. 3 is a schematic side view of the template illustrated in FIGS. 1 through 2 shown in cooperation with an alignment laser and an elevation laser.
Figure 4:
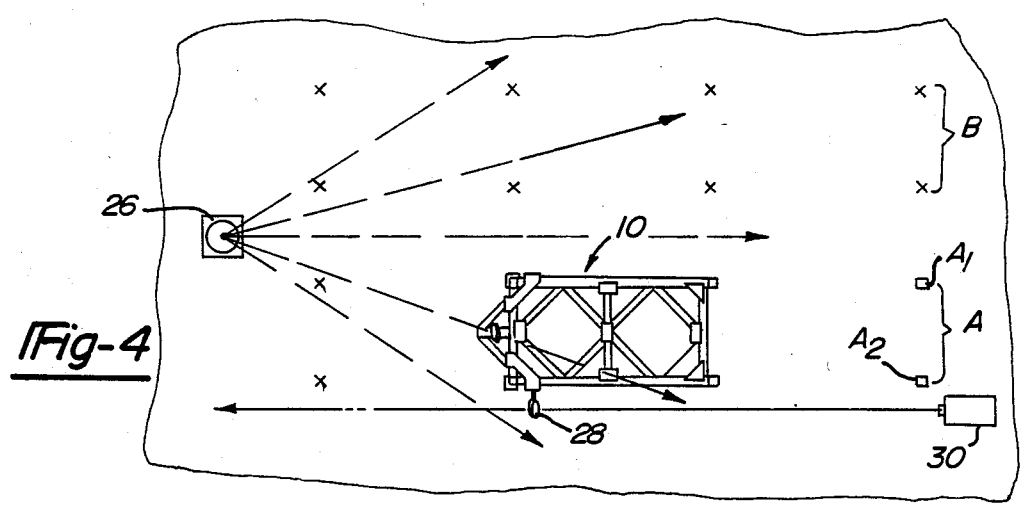
FIG. 4 is a schematic plan view of a solar field having multiple rows A, B etc. illustrating the use of the template to install an array of support posts of photovoltaic panel support assemblies.

In operation, frame 12 is initially positioned horizontally and longitudinally on the ground. Thereafter, clamps 18 are affixed to reference posts 20. It will be appreciated that reference posts 20 may be installed and serve as both reference posts and the first two posts of each row. With reference to FIG. 4, the first two posts of row A, for example, are designated as $A_1$ and $A_2$. Alternatively, reference posts 20 may be temporarily mounted in the form of stakes. In the latter arrangement, the first two posts of each row will then be installed using template 10. Regardless of the approach taken to initially align the template, reference posts 20 must still be individually leveled, spaced and oriented in order to properly align template 10 for the installation of the next set of posts in the row. To achieve the proper longitudinal orientation of template 10, frame 12 is provided with alignment monitoring means in the form of a second laser target 28 which is affixed to frame work end 16. Laser target 28 is designed for use in cooperation with an alignment laser 30 to monitor and adjust the longitudinal alignment of template 10. Referring to FIGS. 3 and 4, it can be seen that alignment laser 30 is intended to be removably mounted at the front of each row in order to monitor the longitudinal alignment of template 10. Thus, as template 10 is repositioned to install posts in a new row, it is contemplated that laser 30 will be repositioned accordingly.

Figure 2:
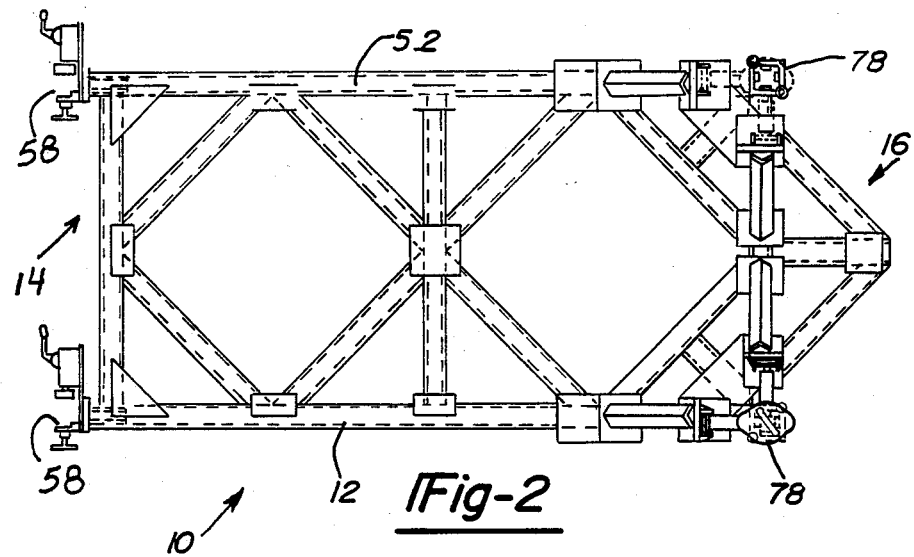
FIG. 2 is a plan view of the template shown in FIG 1.
Figure 5:
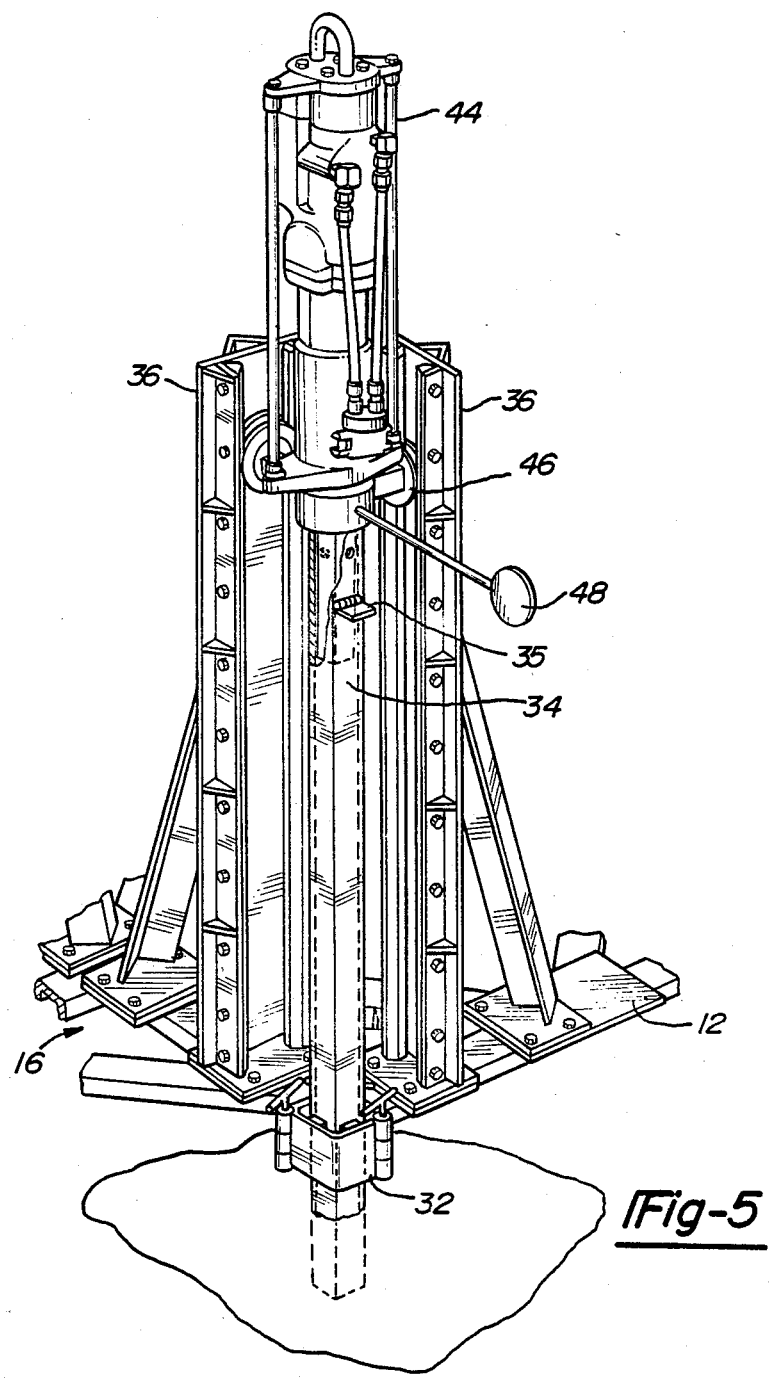
FIG. 5 is a partial perspective view of the template shown in FIGS. 1, 2 and 3 enlarged to show the telescopic support features of the invention.

As illustrated in FIGS. 1, 2 and 5, there is further provided a plurality of post guides 32 affixed to the frame work end 16 at predetermined locations for positioning posts 34 to be installed and guiding them into the ground during installation. It is contemplated that post guides 32 may be adjusted to accommodate and guide posts of varying diameter. There is further provided a plurality of vertical guide rails 36 affixed to the frame work end 16 at predetermined locations for use in cooperation with post guides 32 to align and support posts 34 while being driven into the ground.

Referring to FIGS. 1 and 5, there is provided a drive chuck 38 having a driving end 40 and an impact end 42 for engagement with a post to be installed 34 and an impact driver 44, respectively. Drive chuck 38 is further provided with guide wheels 46 to guide the drive chuck 38 down guide rails 36. In operation, drive chuck 38 is used in cooperation with impact driver 44, guide rails 36 and post guides 32 to drive posts 34 into the ground in a predetermined orientation. In accordance with the present invention, there is also provided depth monitoring means in the form of a third laser target 48 which is affixed to drive chuck 38 for use in cooperation with elevation laser 26 to monitor and adjust the depth of installation of each of the posts 34. Alternatively, posts 34 may be provided with a stopper member 35 radially extending therefrom at a predetermined position for contacting the ground during installation and mechanically limiting the depth each post 34 is driven into the ground. In addition, an electrical limit switch may be included to control the depth of each post.

In an alternative embodiment illustrated in FIG. 6, a template for installing in the ground an array of support posts of a photovoltaic panel support assembly is indicated generally by reference numeral 50 and comprises a rigid frame 52 having a reference end 54 and a work end 56. As in the case of the first preferred embodiment, there is provided a plurality of releasable clamps 58 affixed to the frame reference end 54 at predetermined locations for fastening the frame 52 to reference posts such as those illustrated by reference numeral 20 in FIG. 4.

Returning to FIG. 6, there is further provided a jack 60 and elevation monitoring means in the form of a first laser target 62 affixed to the frame work end 56 for use in cooperation with an elevation laser of the type illustrated in FIG. 4 by reference numeral 26 to monitor and adjust the elevation of the template to a predetermined height. There is further provided alignment monitoring means in the form of a second laser target 64 which is affixed to frame work end 56 for use in cooperation with an alignment laser of the type illustrated by reference numeral 30 in FIGS. 3 and 4 to monitor and adjust the longitudinal alignment of template 50.

Additionally, there is provided a plurality of posts guides 66 affixed to the frame work end 56 at predetermined locations for positioning the posts 68 to be installed and guiding them into the ground during installation. There is further provided a plurality of vertical guide rails 70 affixed to the frame work end 56 at predetermined locations for use in cooperation with post guides 66 to align and support posts 68 while being driven into the ground.

In the particular device illustrated, there is further provided a plurality of drive chucks 72 each having a driving end 74 and an impact end 76 for engagement with a post 68 to be installed and an impact driver 78, respectively.

As illustrated in FIG. 6, impact drivers 78 may be attached to the frame work end 56. Drive chucks 72 are further provided with guide wheels 80 to guide drive chucks 74 down guide rails 70. Additionally, depth monitoring means is provided in the form of a third laser target 82 which is affixed to drive chuck 72 for use in cooperation with an elevation laser such as the one illustrated by reference numeral 26 in FIGS. 3 and 4 to monitor the depth of installation of each of the posts 68.

Pursuant to the present invention, provision is also made for a closed loop electrical communication system whereby impact drivers 78, laser target 82 and an elevation laser of the type illustrated by reference numeral 26 in FIGS. 3 and 4 are in constant communication such that impact drivers 78 will be automatically shut-off when a post 68 is installed to a predetermined depth.

There is further provided cables or chains 84 for attaching the frame 52 to the boom of a crane 86 such that the frame may be easily raised and moved to the next succeeding position.

In both the preferred and alternative embodiments, template 10 and 58, respectively, is repositioned after installation of posts 34 and 68, respectively, so that it may be affixed to one or more previously installed posts for proper alignment therewith.

While the best modes for carrying out the invention have been described in detail, those familiar with the art to which this invention relates will recognize alternative designs and embodiments for practicing the invention as defined by the following claims.

What is claimed is:

1. A portable adjustable template for use in cooperation with an impact driver for installing in the ground an array of posts of a photovoltaic panel support assembly, said template comprising:
    a rigid frame to be positioned horizontally and longitudinally on the ground, said frame having a reference end and a work end;
    a plurality of post guides affixed to said frame work end at predetermined locations for positioning posts to be installed and guiding them into the ground during installation;
    clamping means for affixing said frame reference end to a previously installed post and aligning said frame therewith;
    a plurality of guide rails affixed to said frame work end at predetermined locations, each of said guide rails cooperating with a post guide to telescopically support a post while being driven into the ground;
    a drive chuck having an impact end for engagement with the impact driver and a driving end for engagement with a post to be installed, wherein said drive chuck is used in cooperation with a guide rail and a post guide to drive said post into the ground.

2. A template as in claim 1 wherein the impact driver is affixed to said frame.

3. A template as in claim 1 further comprising adjustment means for adjusting the elevation of the template to a predetermined height.

4. A template as in claim 3 wherein said adjustment means further comprises a jack affixed to said frame work end to raise or lower the template.

5. A template as in claim 1 further comprising depth monitoring means for monitoring the depth of each post during installation to achieve a predetermined depth.

6. A template as in claim 5 wherein said depth monitoring means further comprises a stopper member radially extending from a predetermined position on each of said posts to be installed for contacting the ground during installation and limiting the depth of installation of said posts.

7. A template as in claim 5 wherein said depth monitoring means further comprises a laser target affixed to said drive chuck at a predetermined location used in cooperation with an elevation laser.

8. A template as in claim 5 wherein said depth monitoring means is in electric communication with the impact driver in a closed loop system such that the impact driver is automatically shutoff when a post is installed to said predetermined depth.

9. A template as in claim 1 further comprising alignment monitoring means for monitoring the longitudinal alignment of said frame to achieve a predetermined orientation.

10. A template as in claim 9 wherein said alignment monitoring means further comprises a laser target affixed to said frame work end at a predetermined location used in cooperation with an alignment laser.

11. A template as in claim 1 further comprising elevation monitoring means for monitoring the elevation of said template to achieve a predetermined height.

12. A template as in claim 11 wherein said elevation monitoring means further comprises a laser target affixed to said frame work end at a predetermined location used in cooperation with an elevation laser.

13. A template as in claim 1 wherein said clamping means further comprises a plurality of releasable clamps affixed to said frame reference end at predetermined locations.

14. A template as in claim 1 wherein said post guides are adjustable.

15. A template as in claim wherein said guide rails are substantially vertical.

16. A template as in claim 1 further comprising means for attaching said frame to the boom of a crane such that said frame may be raised and moved to the next succeeding position.

17. A portable adjustable template for use in cooperation with an impact driver for installing in the ground an array of posts of a photovoltaic panel support assembly, said template comprising:
    a rigid frame to be positioning horizontally and longitudinally on the ground, said frame having a reference end and a work end;
    adjustment means for adjusting the elevation of the template affixed to said frame reference end;
    elevation monitoring means for monitoring the elevation of the template to achieve a predetermined height;
    a plurality of post guides affixed to said frame work end at predetermined locations for positioning posts to be installed and guiding them into the ground during installation;
    a plurality of releasable clamps affixed to said frame reference end at predetermined locations for fastening said frame to previously installed posts and aligning said frame therewith;

alignment monitoring means for monitoring the longitudinal alignment of said frame to achieve a predetermined orientation;

a plurality of guide rails affixed to said frame work end at predetermined locations, each of said guide rails cooperating with a post guide to telescopically support the post while being driven into the ground;

a drive chuck having an impact end for engagement with an impact driver and a driving end for engagement with a post to be installed, wherein said drive chuck is used in cooperation with a guide rail and a post guide to drive said post into the ground; and depth monitoring means for monitoring the installation of each post during installation to achieve a predetermined depth of each post.

18. A template as in claim 17 wherein said post guides adjustable.

19. A template as in claim 17 wherein said guide rails are substantially vertical.

20. A template as in claim 17 wherein said elevation monitoring means further comprises a laser target affixed to said frame work end at a predetermined location used in cooperation with an elevation laser.

21. A template as in claim 17 wherein said alignment monitoring means further comprises a laser target affixed to said frame work end at a predetermined location and used in cooperation with an alignment laser.

22. A template as in claim 17 wherein said depth monitoring means further comprises a stopper member radially extending from a predetermined position on each of said posts to be installed for contacting the ground during installation and limiting the depth of installation of said posts.

23. A template as in claim 17 wherein said depth monitoring means further comprises a laser target affixed to said drive chuck at a predetermined location used in cooperation with an elevation laser.

24. A template as in claim 17 wherein said adjustment means further comprises a jack affixed to said frame work end to raise or lower the template.

25. A template as in claim 17 wherein said depth monitoring means is in electronic communication with the impact driver in a closed loop system such that the impact driver is automatically shutoff when a post is installed to said predetermined depth.

26. A template as in claim 17 further comprising means for attaching said frame to the boom of a crane such that said frame may be raised and moved to the next succeeding position.

27. A portable adjustable template for use in cooperation with at least one impact driver, an alignment laser and an elevation laser for installing in the ground an array of posts of a photovoltaic panel support assembly, said template comprising:

a rigid frame to be positioned horizontally and longitudinally on the ground, said frame having a reference end and a work end;

adjustment means for adjusting the elevation of the template affixed to said frame reference end;

a laser target affixed to said frame work end at a predetermined location used in cooperation with the elevation laser to monitor the adjustment of said frame to achieve a predetermined height;

a laser target affixed to said frame work end at a predetermined location used in cooperation with an alignment laser to monitor the longitudinal alignment of said frame to achieve a predetermined orientation;

a plurality of adjustable post guides affixed to said frame work end at predetermined locations for positioning posts to be installed and guiding them into the ground during installation;

a plurality of releasable clamps affixed to said frame reference end at predetermined locations for fastening said frame to previously installed posts and aligning said frame therewith;

a plurality of vertical guide rails affixed to said frame work end at predetermined locations, each to said guide rails cooperating with a post guide to telescopically support the posts while being driven into the ground;

a drive chuck having an impact end for engagement with an impact driver and a driving end for engagement with a post to be installed, wherein said drive chuck is used in cooperation with a guide rail and a post guide to drive said post into the ground;

a laser target affixed to said drive chuck at a predetermined location used in cooperation with an elevation laser to monitor the depth of each post to during installation to achieve a predetermined depth.

28. A template as in claim 27 wherein the impact driver is affixed to said frame.

29. A template as in claim 27 wherein said adjustment means further comprises a jack affixed to said frame work end to raise or lower the template.

30. A template as in claim 27 wherein said depth monitoring means is in electronic communication with the impact driver in a closed loop system such that the impact driver is automatically shutoff when a post is installed to said predetermined depth.

31. A template as in claim 27 further comprising means for attaching said frame to the boom of a crane such that said frame may be raised and moved to the next succeeding position.

32. A method for installing in the ground an array of posts of a photovoltaic panel support assembly, comprising the steps of:

providing a template having at least one post guide at a predetermined location and means for aligning said template with at least one previously installed post;

affixing said template to at least one previously installed post;

horizontally and longitudinally positioning said template on the ground;

providing means for driving the posts into the ground;

positioning a post in said post guide;

driving a post in cooperation with said driving means through said post guide; and repositioning said template such that it may be affixed to at least one previously installed post and the above steps may be replicated.

33. A method as in claim 32 further comprising the step of monitoring and adjusting the longitudinal alignment of said frame to achieve a predetermined orientation.

34. A method as in claims 32 or 33 further comprising the step of monitoring and adjusting the elevation of said template to achieve a predetermined height.

35. A method as in claims 32, 33 or 34 further comprising the step of monitoring and adjusting the position of the posts during installation to achieve installation of the posts to predetermined depths.

36. A method for installing in the ground a plurality of posts of a photovoltaic panel support assembly, comprising the steps of:

providing a template having at least one post guide at a predetermined location and means for affixing said template to at least one previously installed post;

affixing said template to at least one previously installed post;

horizontally positioning said template on the ground while monitoring and adjusting its longitudinal alignment to achieve a predetermined orientation;

vertically leveling said template while monitoring and adjusting its elevation to achieve a predetermined height;

providing driving means for driving the posts into the ground;

positioning a post in said post guide;

driving a post in cooperation with said driving means through said post guide while monitoring its position to achieve a predetermined depth; and repositioning said template such that it may be affixed to at least one previously installed post and the above steps may be replicated.

* * * * *

UNITED STATES PATENT AND TRADEMARK OFFICE
CERTIFICATE OF CORRECTION

PATENT NO. : 4,907,915

DATED : March 13, 1990

INVENTOR(S) : Robert D. Nicholson, et al.

It is certified that error appears in the above-identified patent and that said Letters Patent is hereby corrected as shown below:

| | |
|---|---|
| Column 1, Line 66 | "construction" should be -- constructions --; |
| Column 3, Line 20 | "through" should be -- and --; |
| Column 6, Line 43 | After "claim", insert -- 1 --; |
| Column 7, Line 18 | Before "adjustable", insert -- are --; and |

Signed and Sealed this

Fifteenth Day of December, 1992

*Attest:*

DOUGLAS B. COMER

*Attesting Officer*   *Acting Commissioner of Patents and Trademarks*